United States Patent
Lepage

(10) Patent No.: US 10,209,710 B2
(45) Date of Patent: Feb. 19, 2019

(54) AIRCRAFT PILOTING ASSISTANCE SYSTEM AND METHOD

(71) Applicant: DASSAULT AVIATION, Paris (FR)

(72) Inventor: Sébastien Lepage, Courbevoie (FR)

(73) Assignee: DASSAULT AVIATION, Paris (FR)

( * ) Notice: Subject to any disclaimer, the term of this patent is extended or adjusted under 35 U.S.C. 154(b) by 43 days.

(21) Appl. No.: 15/063,940

(22) Filed: Mar. 8, 2016

(65) Prior Publication Data

US 2016/0272336 A1 Sep. 22, 2016

(30) Foreign Application Priority Data

Mar. 18, 2015 (FR) ...................................... 15 00534

(51) Int. Cl.
| | | |
|---|---|---|
| *G05D 1/00* | (2006.01) | |
| *G05D 1/08* | (2006.01) | |
| *B64D 31/08* | (2006.01) | |
| *B64C 19/02* | (2006.01) | |
| *B64C 13/02* | (2006.01) | |
| *B64C 13/16* | (2006.01) | |
| *G01C 23/00* | (2006.01) | |

(52) U.S. Cl.
CPC .......... *G05D 1/0066* (2013.01); *B64C 13/16* (2013.01); *B64C 19/02* (2013.01); *B64D 31/08* (2013.01); *G05D 1/0055* (2013.01); *G05D 1/0816* (2013.01); *G01C 23/00* (2013.01)

(58) Field of Classification Search
CPC .. G05D 1/0066; G05D 1/0816; G05D 1/0055; B64C 13/16; B64C 19/02; B64D 31/08
See application file for complete search history.

(56) References Cited

U.S. PATENT DOCUMENTS 4,764,872 A * 8/1988 Miller .................. G05D 1/0638
244/181
5,367,460 A * 11/1994 Fabre .................. G05D 1/0607
701/14

(Continued)

FOREIGN PATENT DOCUMENTS

FR 2 677 605 A1 12/1992

OTHER PUBLICATIONS

French Search Report of priority application.

*Primary Examiner* — Dale W Hilgendorf
(74) *Attorney, Agent, or Firm* — Davidson, Davidson & Kappel, LLC

(57) ABSTRACT

A piloting assistance system for an aircraft during manual piloting is provided. The piloting assistance system includes a monitoring module, configured to compare an acceleration of the aircraft to an authorized acceleration that depends on a speed of the aircraft, an acceleration control module, able to be switched between an activated state and a deactivated state, and configured so as, in the activated state, excluding the deactivated state, to generate a control signal of at least one control device of the acceleration of the aircraft to push the acceleration of the aircraft toward the authorized acceleration range, in order to keep or push the speed of the aircraft in a predefined usage speed range, the monitoring module being configured to activate the acceleration control module when the acceleration of the aircraft is not comprised in the authorized acceleration range.

26 Claims, 4 Drawing Sheets

(56) References Cited

U.S. PATENT DOCUMENTS

| | | | | |
|---|---|---|---|---|
| 5,884,870 | A * | 3/1999 | Maffre | G05D 1/0607 244/181 |
| 5,912,627 | A * | 6/1999 | Alexander | G05D 1/0607 701/14 |
| 5,913,627 | A * | 6/1999 | Freeman | G07B 17/00661 400/630 |
| 6,246,929 | B1 * | 6/2001 | Kaloust | G05D 1/0816 701/11 |
| 7,164,366 | B2 * | 1/2007 | Delaplace | B64D 45/00 340/438 |
| 7,676,303 | B2 * | 3/2010 | Hanel | G05D 1/0816 701/2 |
| 9,218,002 | B2 * | 12/2015 | Schulte et al. | G05D 1/0816 |
| 2010/0078518 | A1 | 4/2010 | Tran et al. | |

* cited by examiner

AIRCRAFT PILOTING ASSISTANCE SYSTEM AND METHOD

This claims the benefit of French Patent Application FR 15 00534, filed Mar. 18, 2015 and hereby incorporated by reference herein.

The present invention relates to an aircraft piloting assistance system during manual piloting of said aircraft.

The invention in particular aims to assist pilot during piloting in manual mode, so as to keep the speed of the aircraft in a given speed range, for example to keep the speed of the aircraft below a maximum authorized speed, corresponding to a structural limit of the aircraft, and above a minimum authorized speed, associated with an aerodynamic stall incidence of the aircraft.

BACKGROUND

In order to keep the speed of an aircraft in such a speed range, it is known to provide the aircraft with a protection system configured to limit the angle of attack and attitude of the aircraft, in order to avoid reaching the stall speed of the aircraft, and to gradually introduce, from a threshold speed, a pull up depth command in order to avoid reaching the structural limit of the aircraft.

Nevertheless, these solutions do not make it possible to protect the aircraft against loss of maneuverability. In particular, at low speeds, the capacity of the aircraft to pull up decreases until it is canceled out. Under such conditions, the pilot no longer has a sufficient maneuvering margin in terms of angle of attack to increase the load factor of the aircraft and quickly modify the trajectory of the aircraft.

Likewise, at high speeds, the capacity of the aircraft to dive decreases until it is canceled out, altering the pilot's maneuvering margin to modify the trajectory of the aircraft.

To resolve this problem, it has been proposed to equip the aircraft with a speed control system, activated once the speed of the aircraft crosses a predetermined threshold, and configured to enslave the speed of the aircraft by controlling the throttle.

SUMMARY OF THE INVENTION

This solution is not fully satisfactory. Indeed, this solution is based on controlling only the thrust, irrespective of the flight configuration of the aircraft, without intervening on the drag of the aircraft, and is therefore generally not optimal. Furthermore, the implementation of the protection, which involves going from manual control of the throttle to automatic control of the throttle, can disrupt the manual piloting of the aircraft by the pilot.

An object of the invention is to provide an aircraft piloting assistance system that makes it possible to assist the pilot during manual piloting in order to avoid reaching the upper and/or lower predetermined speed limits while avoiding a loss of maneuverability of the aircraft, with minimal disruption to the manual piloting of the aircraft.

To that end, the invention provides a system of the aforementioned type, characterized in that said system comprises:

a monitoring module, configured to compare, at each moment, an acceleration of the aircraft at said moment to an authorized acceleration range for the aircraft at said moment, said authorized acceleration range depending on the speed of the aircraft at said moment, an acceleration control module, able to be switched between an activated state and a deactivated state, said acceleration control module being configured so as, in the activated state, excluding the deactivated state, to generate a control signal of at least one control device of the acceleration of the aircraft at least at one control moment in order to bring the acceleration of the aircraft toward said authorized acceleration range, in order to keep or bring the speed of the aircraft in or toward a predefined usage speed range, said monitoring module being configured to activate said acceleration control module at a given activation moment when the acceleration of the aircraft at said given activation moment is not comprised in said authorized acceleration range.

According to other aspects, the piloting assistance system includes one or more of the following features:

said monitoring module is configured to deactivate said acceleration control module at a given deactivation moment, after said given activation moment, when the acceleration of the aircraft at said given deactivation moment is comprised in said authorized acceleration range;

said acceleration control device is comprised in the group consisting of a device for modifying the drag of the aircraft, a device for modifying the thrust of the aircraft, and a device for modifying the trajectory of the aircraft;

said usage speed range is defined between an upper bound corresponding to a maximum usage speed of the aircraft, and a lower bound corresponding to a minimum usage speed of the aircraft;

said authorized acceleration range is defined by at least one upper acceleration bound authorized at said moment, said upper bound depending on the deviation between the speed of the aircraft at said moment and the maximum usage speed of the aircraft;

said authorized acceleration range is defined by at least one lower acceleration bound authorized at said moment, said lower bound depending on the deviation between the speed of the aircraft at said moment and the minimum usage speed of the aircraft;

said usage speed range is defined between an upper bound corresponding to a maximum maneuverability speed of the aircraft, and a lower bound corresponding to a minimum maneuverability speed of the aircraft;

the acceleration control module is configured to:
  compare a speed of the aircraft at said control moment to said usage speed range, and to
  generate a control signal of a first type if the speed of the aircraft at said control moment is comprised in said usage speed range, in order to keep the speed of the aircraft in said usage speed range, and
  generate a control signal of a second type, different from the first type, if the speed of the aircraft at said control moment is not comprised in said usage speed range, in order to bring the speed of the aircraft toward said usage speed range;

the control signal of the first type is a control signal of at least one device for modifying the drag or thrust of the aircraft, and the control signal of the second type is a control signal of at least one device for modifying the trajectory of the aircraft;

the system comprises a device for displaying information relative to the flight of the aircraft, said information comprising information relative to an energy variation of the aircraft, said display device being configured to show, on the viewing screen, an energy variation symbol representative of a current value of the total energy variation of the aircraft, and at least one energy variation bound symbol representative of a threshold value of said total energy variation, corresponding to a bound of said authorized acceleration range.

The invention also provides an aircraft piloting assistance method for an aircraft during manual piloting of said aircraft using an assistance system according to the invention, said method comprising:

an activation step, during which said monitoring module detects that the acceleration of the aircraft at a given activation moment is not comprised in said authorized acceleration range, and activates said acceleration control module, a step for the generation, by said activated acceleration control module, of a control signal of at least one device for controlling the acceleration of the aircraft at least at one control moment in order to bring the acceleration of the aircraft toward said authorized acceleration range, in order to maintain or bring the speed of the aircraft in or toward said usage speed range.

According to other aspects, the piloting assistance method includes one or more of the following features:

said generating step comprises:
  a phase for comparing a speed of the aircraft at said control moment to said usage speed range, and
  a phase for generating a control signal of at least one acceleration control device of the aircraft of a first type, if the speed of the aircraft at said control moment is comprised in said usage speed range, in order to keep the speed of the aircraft in said usage speed range, or
  a phase for generating a control signal of at least one device controlling the acceleration of the aircraft of a second type, different from the first type, if the speed of the aircraft at said control moment is not comprised in said usage speed range, in order to bring the speed of the aircraft toward said usage speed range;

the control signal of the first type is a control signal of at least one device for modifying the drag or thrust of the aircraft, and the control signal of the second type is a control signal of at least one device for modifying the trajectory of the aircraft;

the method further includes a deactivation phase, after said generating step, during which the monitoring module detects that the acceleration of the aircraft is comprised in said authorized acceleration range, at a given deactivation moment after said given activation moment, and deactivates said acceleration control module.

BRIEF SUMMARY OF THE DRAWINGS

The invention will be better understood in light of the example embodiments of the invention that will now be described in reference to the appended figures, in which.

DETAILED DESCRIPTION

Figure 1:
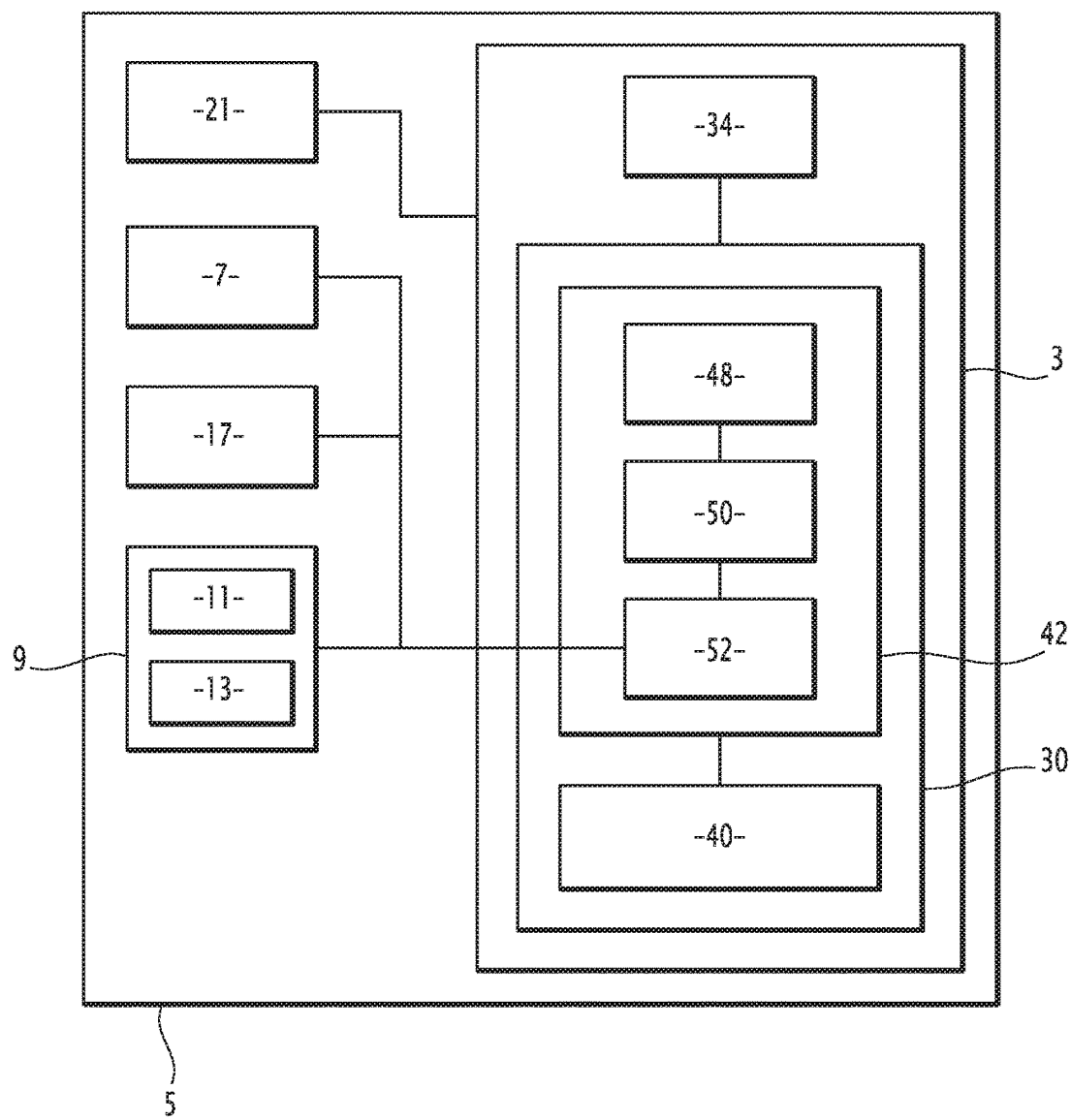
FIG. 1 diagrammatically illustrates a piloting assistance system according to one embodiment of the invention.

FIG. 1 shows a piloting assistance system 3 for an aircraft 5 according to one embodiment of the invention.

The aircraft 5 includes a propulsion system 7, for example a set of engines able to exert a thrust force on the aircraft 5.

The aircraft 5 further includes devices 9 for modifying the drag force exerted by the air on the aircraft 5, subsequently called drag modifying devices, for example drag control surfaces such as air brakes 11 and spoilers 13.

The air brakes 11 can be actuated between a withdrawn position, in which the air brakes 11 do not exert any influence on the drag, and a deployed position, in which the air brakes 11 increase the drag of the aircraft 5.

The spoilers 13 can also be actuated between a withdrawn position, in which the spoilers 13 do not exert any influence on the drag, and a deployed position, in which the spoilers 13 increase the drag of the aircraft 5. When the spoilers 13 are deployed, they also decrease the lift of the aircraft 5.

The aircraft 5 also includes devices 17 for modifying the trajectory of the aircraft 5, for example an elevator and ailerons.

The aircraft 5 further comprises high lift devices, such as slats and flaps, able to modify the lift of the aircraft 5.

The propulsion system 7, the devices 9 modifying the drag force exerted by the air on the aircraft 5 and the devices 17 modifying the trajectory of the aircraft 5 form devices for controlling the acceleration of the aircraft.

The configuration of the slats, flaps and control surfaces will be referred to below as the aerodynamic configuration of the aircraft 5.

The aircraft 5 further includes a plurality of sensors 21 making it possible to determine the values of flight parameters of the aircraft 5, such as its position, its altitude z, its speed and its acceleration relative to the air and the ground.

For example, an anamometer or airspeed indicator makes it possible to determine an indicated airspeed $V_I$ of the aircraft 5, which is the speed of the aircraft 5 relative to the air, coming directly from pressure measurements.

The system 3 is configured to assist the crew of the aircraft 5 during manual flight, to keep the speed of the aircraft 5 in a first speed range.

In the rest of the description, unless otherwise indicated, the "speed" of the aircraft 5 is the indicated airspeed $V_I$, and the acceleration will refer to a variation of the indicated airspeed of the aircraft 5, whether it involves a positive acceleration or negative acceleration, also called deceleration.

Hereinafter, "range", in particular of a speed or acceleration, will refer to a speed or acceleration interval defined by at least one bound with a finite value.

The first speed range for example corresponds to a speed range achievable by the aircraft 5.

The first speed range is preferably defined by a maximum speed, denoted $V_{max}$, and a minimum speed, denoted $V_{min}$.

The speed $V_{max}$ for example corresponds to a structural limit of the aircraft 5: it is for example a maximum speed that the aircraft 5 can assume without risk to its structure, denoted VD, decreased by a reduced safety margin. For example, $V_{max}=VD-X$, where X is approximately several meters per second, for example $0<X\leq20$ m/s.

Preferably, the speed $V_{max}$ has a fixed value, in particular independent of the aerodynamic configuration of the aircraft 5 and the flight phase of the aircraft 5.

The minimum speed $V_{min}$ is for example a stall speed of the aircraft 5, increased by a safety margin. The minimum speed $V_{min}$ thus corresponds to the stall incidence of the aircraft 5, beyond which an aerodynamic stall of the aircraft 5 occurs.

The speed $V_{min}$ depends on the aerodynamic configuration of the aircraft 5, the weight of the aircraft 5 and the load factor of the aircraft 5.

The system 3 is configured to assist the crew of the aircraft 5 during manual flight, in order to help the crew keep the speed of the aircraft 5 in the first speed range, and if possible in a second speed range.

In general, the second speed range is defined as a usage speed range desired for the aircraft 5. The second speed range is comprised in the first speed range.

This second speed range is for example a maneuverability range of the aircraft, i.e., a speed range in which the aircraft 5 is considered to be maneuverable, and outside which the maneuverability of the aircraft 5 is reduced.

According to another example, the second speed range is a speed range associated with a flight time constraint, i.e., a speed range making it possible to ensure that the flight time of the aircraft will indeed be comprised in a given flight time range.

According to another example, the second speed range is a speed range associated with a reduced flight envelope, for example in case of mechanical failure.

In the rest of the description, it will be considered, as an example, that the second flight range is a maneuverability range of the aircraft.

The second speed range is preferably defined by a maximum usage speed, which in the described example is a maximum maneuverability speed, denoted $V_{MMSup}$, and a minimum usage speed, which in the described example is a minimum maneuverability speed, denoted $V_{MMInf}$.

The maximum maneuverability speed $V_{MMSup}$ is a speed up to which minimal maneuverability of the aircraft 5 is guaranteed.

The maximum maneuverability speed $V_{MMSup}$ is preferably independent of the aerodynamic configuration of the aircraft 5 and the flight phase of the aircraft 5.

For example, the maximum maneuverability speed $V_{MMSup}$ is defined as a function of the speed VD, in particular as the speed VD decreased by an increased safety margin. Thus, the maximum maneuverability speed $V_{MMSup}$ is always below the maximum speed $V_{max}$.

For example, $V_{MMSup}=VD-X'$, where X' is approximately several meters per second, for example $10<X'\leq30$ m/s.

The minimum maneuverability speed $V_{MMInf}$ is a speed of the aircraft below which a minimum maneuverability of the aircraft 5 is guaranteed.

For example, the minimum maneuverability speed $V_{MMInf}$ is proportional to the speed VS1 g, which is the stall speed of the aircraft 5 under a load factor of 1 g. The minimum maneuverability speed $V_{MMInf}$ is that expressed by $V_{MMInf}=k*VS1$ g, where k is a proportionality factor. For example, $1\leq k\leq 1.2$.

Preferably, the proportionality factor k depends on the flight phase of the aircraft 5. In particular, k can assume a first value during takeoff, and a second value, different from the first value, in particular greater than the first value, during the rest of the flight.

The minimum maneuverability speed $V_{MMInf}$ is generally higher than the minimum speed $V_{min}$.

The system 3 comprises a computer 30 and man-machine interface means, in particular an information display device 34.

The computer 30 includes a processor 40 and a memory 42.

The processor 40 is suitable for executing applications contained in the memory 42, in particular an operating system allowing the traditional operation of a computer system.

The memory 42 comprises different memory zones containing software modules able to be executed by the processor 40, and data sets.

In particular, the memory 42 comprises an estimating module 48, a monitor in the form of a monitoring module 50 and an acceleration controller in the form of an acceleration control module 52.

The estimating module 48 is configured to determine, at each moment, the first and second speed ranges.

In particular, the estimating module 48 is configured to determine, at each moment, the speeds $V_{min}$, $V_{max}$, $V_{MMInf}$ and $V_{MMSup}$.

The estimating module 48 is also configured to determine, at each moment, a third speed range, included in the first and second ranges. This third speed range is preferably an operational speed range of the aircraft 5, determined between a lower bound, denoted $V_{minOp}$, corresponding to a minimum operational speed of the aircraft 5, and an upper bound, denoted $V_{maxOp}$, corresponding to the maximum operational speed of the aircraft 5.

The minimum operational speed $V_{minOp}$ is greater than the minimum maneuverability speed $V_{MMInf}$. The minimum operational speed $V_{minOp}$ is for example proportional to the speed VS1 g, and is expressed by $V_{minOp}=k'*VS1$ g, where k' is a proportionality factor greater than k. For example, $1.2\leq k'\leq 1.5$.

Preferably, the proportionality factor k' depends on the flight phase of the aircraft 5. Normally, k' assumes a first value during takeoff, and a second value, different from the first value, in particular higher than the first value, during the rest of the flight.

The maximum operational speed $V_{maxOp}$ is lower than the maximum maneuverability speed $V_{MMSup}$. The maximum operational speed $V_{maxOp}$ is preferably fixed.

The estimating module 48 is also configured to determine, at each moment, a total energy variation of the aircraft 5, with a slope of the aircraft 5.

At an altitude z, the aircraft 5 has a total mechanical energy $E_{total}$, sum of its kinetic energy and its potential energy, which can be expressed by:

$$E_{total} = \frac{1}{2}mV_{sol}^2 + mgz \quad (1)$$

where m designates the mass of the aircraft 5 and $V_{sol}$ is its ground speed. The variation of this total energy can be expressed by a total slope $\gamma^T$, according to the equation:

$$\gamma^T = \frac{1}{mgV_{sol}} \frac{dE_{total}}{dt} = \gamma_{sol} + \frac{\dot{V}_{sol}}{g} \quad (2)$$

where $\dot{V}_{sol}$ represents the time drift of the ground speed $V_{sol}$ of the aircraft 5.

This variable $\gamma^T$, homogeneous with a slope, is thus equal to the ground slope $\gamma_{sol}$ of the aircraft 5 when its ground speed $V_{sol}$ remains constant. A variation in the total slope $\gamma^T$ is therefore reflected by a variation in the ground slope $\gamma_{sol}$ and/or a variation in the ground acceleration $\dot{V}_{sol}$ of the aircraft 5. Thus, the total slope $\gamma^T$ represents a variation of the total energy of the aircraft 5.

Yet the critical speeds defined above are speeds of the aircraft 5 relative to the air mass (and not relative to the ground).

The estimating module 48 is thus configured to determine a total energy variation derived from the aforementioned total slope, called pseudo-total slope and designated by the symbol $\gamma^*$.

This variable corresponds to the ground slope which, under current conditions, leads to a constant conventional speed.

Its expression is deduced from the equations of the flight mechanics, and is expressed by:

$$\gamma^* = \gamma_{sol} + \frac{\left(\frac{\partial V_{air}}{\partial V}\right)_{z=cste}}{1 + \frac{V_{sol}}{g} \cdot \left(\frac{\partial V_{air}}{\partial z}\right)_{vc=cste}} \cdot \frac{\dot{V}}{g} = \gamma_{sol} + A \cdot \frac{\dot{V}}{g} \tag{3}$$

$\left(\frac{\partial V_{air}}{\partial V_c}\right)_{z=cste}$ designates the derivative of the airspeed $V_{air}$ of the aircraft with respect to the speed Vc of the aircraft at the current altitude z, and $\left(\frac{\partial V_{air}}{\partial z}\right)_{Vc=cste}$ is the derivative of the airspeed of the aircraft with respect to the altitude z at a constant speed Vc.

The pseudo-total slope $\gamma^*$ is thus a variable homogeneous with a slope of the aircraft 5, and the value of which is representative of the acceleration of the aircraft 5. Indeed, when the acceleration of the aircraft 5 is null, the total pseudo-slope $\gamma^*$ is equal to the ground slope of the aircraft 5, and when the acceleration of the aircraft 5 is positive or negative, the pseudo-total slope $\gamma^*$ is respectively above or below the ground slope of the aircraft 5.

The monitoring module 50 is configured to monitor the speed and acceleration of the aircraft 5, and to activate or deactivate the acceleration control module 52, based on the speed and acceleration of the aircraft 5.

In particular, the monitoring module 50 is configured to determine, at each moment, an authorized acceleration range for the aircraft 5 at that moment, and to compare, at each moment, the acceleration of the aircraft 5 to the authorized acceleration range. The "authorized acceleration range" refers to the acceleration range allowed for the aircraft without an action modifying this acceleration being required, independently of the physical capacities of the aircraft to reach or not reach the bounds of this acceleration range. The authorized acceleration range is therefore not defined by minimum and maximum accelerations that the aircraft is able to achieve, but minimum and maximum accelerations allowed for the aircraft.

Furthermore, the monitoring module 50 is configured to activate the acceleration control module 52 if the acceleration of the aircraft 5 is not comprised in the authorized acceleration range, and to deactivate the acceleration control module 52 if the acceleration of the aircraft 5 is comprised in the authorized acceleration range.

The authorized acceleration range is defined at each moment as a function of the speed of the aircraft 5, in particular as a function of the deviation between the speed of the aircraft 5 at that moment and the second speed range, which in the described example is the maneuverability range of the aircraft 5.

Thus, the comparison of the acceleration to the authorized acceleration range makes it possible to detect situations in which, without action by the pilot, the speed of the aircraft 5 would leave or remain outside the maneuverability range, activate the acceleration control module 52 when such situations are detected, and keep the acceleration control module 52 activated as long as this risk exceeds a determined threshold.

In particular, a case where the acceleration leaves the authorized acceleration range corresponds to a situation in which, if no corrective action is taken to redirect the acceleration, in light of the reaction times of the drag, thrust and trajectory modifying devices, an excursion of the speed of the aircraft 5 outside the maneuverability range will no longer be able to be avoided.

Preferably, the authorized acceleration range is defined by an upper acceleration bound, denoted $Acc_{max}$, and a lower acceleration bound, denoted $Acc_{min}$.

The upper acceleration bound $Acc_{max}$ corresponds to a maximum allowed acceleration in light of the speed of the aircraft 5, in particular the deviation between the maximum maneuverability speed $V_{MMSup}$ and the speed of the aircraft 5.

The monitoring module 50 is configured to determine the upper acceleration bound $Acc_{max}$ at each moment as a function of the deviation between the maximum maneuverability speed $V_{MMSup}$ as determined at that moment by the estimating module 48, and the speed of the aircraft 5 at that moment.

In particular, the upper acceleration bound $Acc_{max}$ is a strictly increasing function of the deviation between the maximum maneuverability speed $V_{MMSup}$ and the speed of the aircraft 5.

Thus, when the speed of the aircraft 5 approaches the maximum maneuverability speed $V_{MMSup}$, i.e., when the deviation between the maximum maneuverability speed $V_{MMSup}$ and the speed of the aircraft 5 decreases, the upper acceleration bound $Acc_{max}$ decreases, which is reflected by an approach of the flight zone in which, without action by the pilot, in light of the acceleration and the reaction time of the acceleration control devices, an excursion of the speed of the aircraft 5 above the maximum maneuverability speed $V_{MMSup}$ will not be able to be avoided.

Furthermore, the upper acceleration bound $Acc_{max}$ is positive as long as the speed of the aircraft 5 remains below the maximum maneuverability speed $V_{MMSup}$, and becomes negative when the speed of the aircraft 5 becomes higher than the maximum maneuverability speed $V_{MMSup}$. This reflects the fact that, when the speed of the aircraft 5 is above the maximum maneuverability speed $V_{MMSup}$, only a negative action below the upper acceleration bound $Acc_{max}$ makes it possible to bring the speed toward the maneuverability range.

The upper acceleration bound $Acc_{max}$ is for example proportional to the deviation between the maximum maneuverability speed $V_{MMSup}$ and the speed of the aircraft 5, and is then expressed as:

$Acc_{max} = K^*(V_{MMSup} - V)$, where K is a strictly positive proportionality factor. For example, the factor K is fixed, in particular independent of the aerodynamic configuration of the aircraft 5 and the flight phase of the aircraft 5.

Alternatively, the upper acceleration bound $Acc_{max}$ is a nonlinear function of the deviation between the maximum maneuverability speed $V_{MMSup}$ and the speed of the aircraft 5.

The lower acceleration bound $Acc_{min}$ corresponds to a minimum authorized acceleration in light of the speed of the aircraft 5, in particular the deviation between the speed of the aircraft 5 and the minimum maneuverability speed $V_{MMInf}$.

The monitoring module 50 is configured to determine the lower acceleration bound $Acc_{min}$, at each moment as a function of the deviation between the minimum maneuverability speed $V_{MMInf}$ as determined by the estimating module 48 and the speed of the aircraft 5 at that moment.

In particular, the lower acceleration bound $Acc_{min}$ is a strictly decreasing function of the deviation between the speed of the aircraft 5 and the minimum maneuverability speed $V_{MMInf}$.

Thus, when the speed of the aircraft 5 decreases and comes closer to the minimum maneuverability speed $V_{MMInf}$, the deviation between the speed of the aircraft 5 and the minimum maneuverability speed $V_{MMInf}$ decreases, and the lower acceleration bound $Acc_{min}$ increases, which reflects an approach of the flight zone in which, without action by the pilot, in light of the negative acceleration and the reaction time of the acceleration control devices, an excursion of the speed of the aircraft 5 below the minimum maneuverability speed $V_{MMInf}$ will not be able to be avoided.

Furthermore, the lower acceleration bound $Acc_{min}$, is negative as long as the speed of the aircraft 5 remains above the minimum maneuverability speed $V_{MMInf}$, and becomes positive when the speed of the aircraft 5 becomes lower than the minimum maneuverability speed $V_{MMInf}$. Indeed, when the speed of the aircraft 5 is below the minimum maneuverability speed $V_{MMInf}$, only a positive acceleration above the lower acceleration bound $Acc_{min}$ makes it possible to bring the speed of the aircraft 5 toward the maneuverability range.

The lower acceleration bound $Acc_{min}$ is for example proportional to the deviation between the minimum maneuverability speed $V_{MMInf}$ and the speed of the aircraft 5, and is then expressed as:

$$Acc_{min} = K'*(V_{MMInf} - V),$$

where K' is a positive proportionality factor. For example, the factor K' is fixed, in particular independent of the aerodynamic configuration of the aircraft 5 and the flight phase of the aircraft 5.

Alternatively, the lower acceleration bound $Acc_{min}$ is a nonlinear function of the deviation between the minimum maneuverability speed $V_{MMInf}$ and the speed of the aircraft 5.

The monitoring module 50 is also configured to determine a pseudo-total slope threshold value $\gamma^*_{max}$ associated with the acceleration $Acc_{max}$ equal to:

$$\gamma^*_{max} = \gamma_{sol} + \frac{Acc_{max}}{g}$$

and a total pseudo-slope threshold value $\gamma^*_{min}$ associated with the acceleration $Acc_{min}$, equal to:

$$\gamma^*_{min} = \gamma_{sol} + \frac{Acc_{min}}{g}.$$

Furthermore, the monitoring module 50 is configured to compare, at each moment, the acceleration of the aircraft 5, as determined from sensors 21, to the lower $Acc_{min}$ and upper $Acc_{max}$ acceleration bounds.

The monitoring module 50 is further configured to activate the acceleration control module 52 if the acceleration of the aircraft 5 at that moment, then called activation moment, is above the upper acceleration bound $Acc_{max}$ or below the lower acceleration bound $Acc_{min}$.

The monitoring module 50 is also configured to deactivate the acceleration control module 52 if the acceleration of the aircraft 5 at that moment, then called the activation moment, is below the upper acceleration bound $Acc_{max}$ and above the lower acceleration bound $Acc_{min}$.

The monitoring module 50 is also configured to compare the speed of the aircraft 5 at each moment to the third speed range, in order to determine whether the speed of the aircraft 5 is comprised in the operational speed range of the aircraft 5, and to generate an alert, intended for the crew, if the speed at that moment is above the maximum operational speed $V_{maxOp}$ or below the minimum operational speed $V_{minOp}$.

Preferably, this alert is only emitted if the absolute value of the deviation between the speed of the aircraft 5 and the maximum or minimum operational speed is above a given threshold, corresponding to an allowance margin, and if the speed of the aircraft 5 remains outside the third speed range for a duration exceeding a predetermined length of time.

This alert is for example emitted by the man-machine interface means 34. This alert is for example an audio and/or visual alert.

The monitoring module 50 is thus configured to generate an alert when the speed of the aircraft 5 leaves the operational speed range, therefore before the speed leaves the maneuverability range. Such an alert thus gives the crew the opportunity to act on the manual controls of the aircraft 5 so that the speed of the aircraft 5 returns to the operational speed range, or at least remains in the maneuverability range.

The acceleration control module 52 can be switched between an activated state and a deactivated state. The acceleration control module 52 is able to be activated and deactivated by the monitoring module 50.

In the activated state, in particular when the acceleration control module 52 goes from the deactivated state to the activated state, the acceleration control module 52 is configured to generate an alarm signal intended for the crew. This alarm signal is intended to warn the crew that an action will be performed by the acceleration control module 52 in order to help the crew keep the speed of the aircraft 5 in the maneuverability range.

The acceleration control module 52 is also configured to generate a control signal of at least one acceleration control device of the aircraft 5, at least at one control moment, in order to keep or bring the speed of the aircraft 5 in the usage speed range.

In particular, the acceleration control module 52 is configured to generate a control signal of the propulsion system 7, in order to modify the thrust of the aircraft 5, and/or a control signal of the devices 9 modifying the drag, in particular the air brakes 11 and spoilers 13, and/or devices 17 modifying the trajectory of the aircraft 5.

In particular, the acceleration control module 52 is configured to generate a control signal of a first type when the speed of the aircraft 5 at the control moment is comprised in the maneuverability range. The control signal of the first type is preferably a control signal of a device modifying the drag or thrust of the aircraft 5.

In particular, when the acceleration of the aircraft 5 exceeds the upper acceleration bound $Acc_{max}$, the acceleration control module 52 is configured first to generate a control signal for the thrust of the aircraft 5, designed to reduce the thrust of the aircraft 5. Then, if the acceleration control module remains active despite this action, i.e., if the acceleration of the aircraft 5 remains above the upper acceleration bound $Acc_{max}$, the acceleration control module 52 is configured to generate a control signal of the drag modifying devices 9, in particular an output signal of the air brakes 11 and/or spoilers 13, in order to increase the drag of the aircraft 5.

Conversely, when the acceleration of the aircraft 5 becomes below the lower acceleration bound $Acc_{min}$, the acceleration control module 52 is configured first generate a control signal of the drag modifying devices 9, in particular a signal to withdraw the air brakes 11 and/or spoilers 13, in order to decrease the drag of the aircraft 5. Then, if the acceleration control module 52 remains activated despite this action, i.e., if the acceleration of the aircraft remains below the lower acceleration bound $Acc_{min}$, the acceleration control module 52 is configured to generate a control signal for the thrust of the aircraft 5, designed to increase the thrust of the aircraft 5.

The acceleration control module 52 is further configured to generate a control signal of a second type, different from the first type, when the speed of the aircraft 5 at the control moment is comprised in the speed range achievable by the aircraft 5 but not comprised in the maneuverability range. The control signal of the second type is preferably a control signal of a device modifying the trajectory of the aircraft 5.

Preferably, when the speed of the aircraft 5 at the control moment is comprised in the speed range achievable by the aircraft 5 but not comprised in the maneuverability range, the acceleration control module 52 is also configured to generate a control signal of the first type, in particular in order to maintain control of the thrust and drag of the aircraft, or to generate an additional control signal for the thrust or drag of the aircraft.

For example, when the acceleration of the aircraft 5 is below the lower acceleration bound $Acc_{min}$, and the speed of the aircraft 5 is not comprised in the maneuverability range, the acceleration control module 52 is configured to prevent deployment of the air brakes 11 and/or spoilers 13, which would increase the drag of the aircraft 5, and to prevent a decrease in the thrust of the aircraft 5.

Conversely, when the acceleration of the aircraft 5 is above the upper acceleration bound $Acc_{max}$ and the speed of the aircraft 5 is not comprised in the maneuverability range, the acceleration control module 52 is configured to prevent a withdrawal of the air brakes 11 and/or the spoilers 13, which would decrease the drag of the aircraft 5, and to prevent an increase in the thrust of the aircraft 5.

Thus, when the acceleration of the aircraft 5 leaves the authorized acceleration range, the acceleration control module 52 is configured to generate an alarm signal for the crew, then act on the thrust and/or drag of the aircraft 5 as long as the speed of the aircraft 5 remains in the maneuverability range, then to act on the trajectory of the aircraft 5 if the speed of the aircraft 5 leaves the maneuverability range.

Furthermore, at high speeds, the acceleration control module 52 is configured to act on the thrust before acting on the drag, whereas at low speeds, the acceleration control module 52 is configured to act on the drag, before acting on the thrust. This sequencing makes it possible to optimize the influence of the drag and thrust modifying devices.

In the deactivated state, the acceleration control module 52 is disconnected from any acceleration control device of the aircraft 5 and therefore does not exert any action on these devices. Thus, when the acceleration of the aircraft 5 leaves the authorized range in light of its speed, the acceleration control module 52 is configured to modify the acceleration of the aircraft 5 until the acceleration of the aircraft 5 is once again comprised in the authorized range. The acceleration control module 52 is then deactivated, and only the manual piloting commands of the aircraft 5 affect the acceleration control devices of the aircraft 5.

Thus, when the acceleration of the aircraft 5 is below the lower acceleration bound $Acc_{min}$, the control signals generated by the acceleration control module 52 are designed only to increase the acceleration of the aircraft 5, but in no case to decrease that acceleration. Likewise, when the acceleration of the aircraft 5 is above the upper acceleration bound $Acc_{max}$, the control signals generated by the acceleration control module 52 are intended only to decrease the acceleration of the aircraft 5, but in no case to increase that acceleration. In other words, the acceleration control module 52 is not configured to regulate the speed and acceleration of the aircraft 5, but only to provide periodic assistance in order to prevent the speed of the aircraft 5 from leaving the maneuverability range, and to prevent the speed of the aircraft 5 from leaving the speed range achievable by the aircraft 5.

The information display device 34 in particular comprises a head-up viewing device and a head-down viewing device.

The information display device 34 is configured to display, for the crew, information relative to the flight of the aircraft 5 during a flight of the aircraft 5.

In particular, the information display device 34 is configured to display information representative of the current acceleration of the aircraft 5 and the authorized acceleration range for the aircraft 5. In particular, the information display device 34 is configured to show, at each moment, a symbol representative of the total energy variation associated with the acceleration of the aircraft 5 at that moment, and to show, at least at some moments, an energy variation bound symbol representative of an energy variation threshold value associated with the upper bound $Acc_{max}$ or the lower bound $Acc_{min}$ for acceleration.

Such a display allows the crew to view the energy variation margin, in particular for acceleration, still available for the aircraft 5, and, if applicable, to inform the crew when the acceleration of the aircraft 5 leaves the authorized acceleration range.

Preferably, the information display device 34 is configured to show an upper energy variation bound symbol, representative of an energy variation threshold value associated with the upper acceleration bound, only when the deviation between the upper acceleration bound and the current acceleration bound is below a predetermined threshold deviation, i.e., when the current acceleration of the aircraft 5 approaches or exceeds the upper acceleration bound $Acc_{max}$.

Likewise, the information display device 34 is configured to show a lower energy variation bound symbol, representative of an energy variation threshold value associated with the value of the lower acceleration bound, only when the deviation between the current acceleration and the lower acceleration bound $Acc_{min}$ is below a predetermined threshold value, i.e., when the current acceleration of the aircraft 5 approaches or exceeds the lower acceleration bound $Acc_{min}$.

Thus, an energy variation bound symbol is only displayed when the acceleration of the aircraft 5 is close to or exceeds the upper $Acc_{max}$ or lower $Acc_{min}$ acceleration bound. Thus, the energy variation bound symbol is only displayed when this information is relevant, which makes it possible both to avoid overloading the information display device 34 and to draw the crew's attention when the acceleration of the aircraft 5 is approaching the upper $Acc_{max}$ or lower $Acc_{min}$ acceleration bound.

Furthermore, the information display device 34 is configured to display information representative of the current state of the aircraft 5 and information relative to speed bounds for the aircraft 5, in particular the first and/or the second speed range.

In particular, the information display device 34 is configured to show a graduated speed scale, along which a speed symbol is illustrated indicating the current speed of the aircraft 5.

The information display device 34 is also configured to show, along the graduated speed scale, speed bound symbols, in particular the maximum $V_{max}$ and minimum $V_{min}$ speeds of the first speed range and/or the maximum and minimum speeds of the second speed range, in the described example the maximum $V_{MMSup}$ and minimum $V_{MMInf}$ maneuverability speed, and/or the maximum $V_{maxOp}$ and minimum $V_{minOp}$ operational speeds.

Such a display makes it possible to provide information to the crew about the maneuvering margins that it has in terms of speed.

Furthermore, the display device 34 is configured to display information relative to the actions performed by the acceleration control module 52, in particular to indicate a modification in the drag, thrust and/or trajectory by the acceleration control module 52. Such a display makes it possible to keep the crew informed and thus to minimize disruptions to manual piloting.

Figure 2:
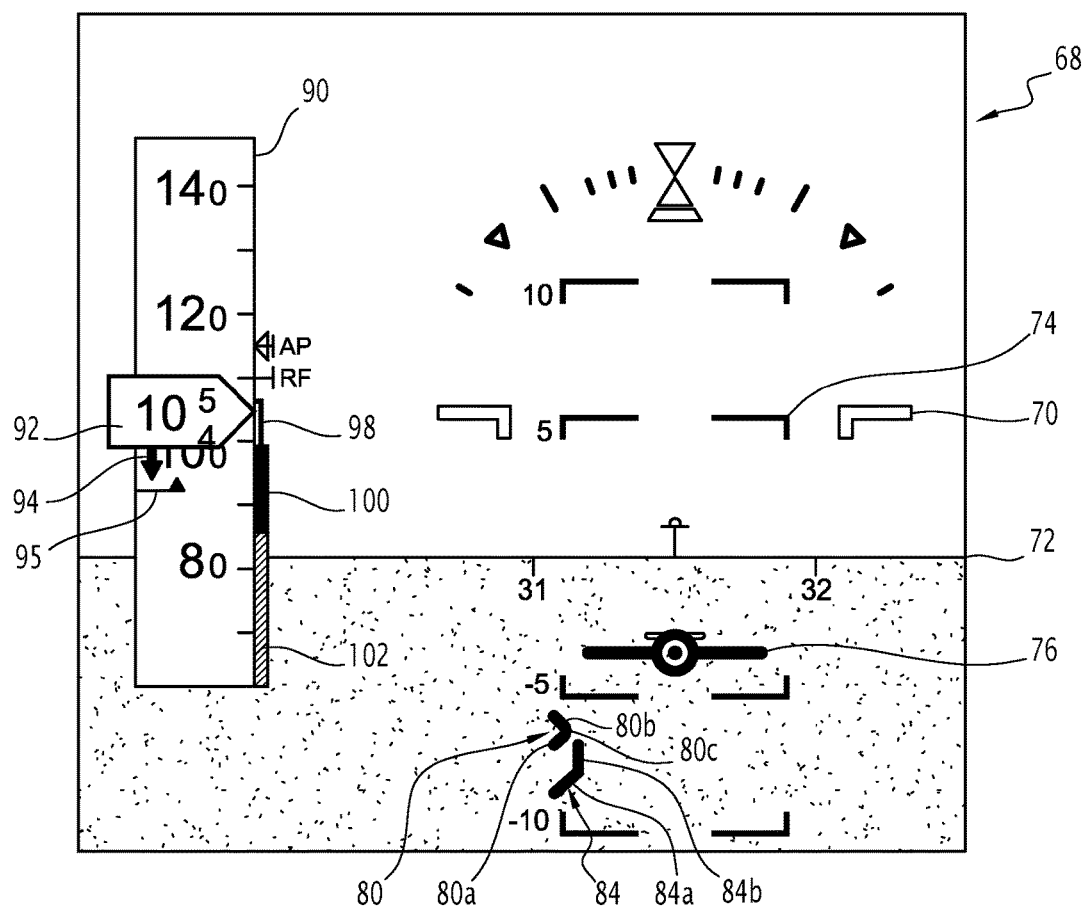
FIG. 2 illustrates an illustration mode by a device for displaying information relative to the speed and acceleration of the aircraft of the system of FIG. 1.

FIG. 2 shows an example illustration of this information by the information display device 34.

The information display device 34 comprises a viewing screen 68 dedicated to piloting of the aircraft 5. FIG. 2 thus shows information projected on this screen, displayed in the form of symbols.

These symbols in particular include a symbol 70 showing a model of the aircraft 5, occupying a fixed position on the screen, which embodies an infinite projection of the longitudinal axis of the aircraft 5, and an artificial horizon line 72, at the center of the graduated slope scale 74. This artificial horizon line 72 is inclined when the roll angle of the aircraft 5 is a non-zero angle, during a turn. A speed vector symbol 76 of the aircraft 5 indicates the direction of the speed vector of the aircraft 5.

The vertical deviation between the artificial horizon line 72 and the speed vector symbol 76 of the aircraft 5 represents the ground slope $\gamma_{sol}$ of the aircraft 5.

Furthermore, an energy variation symbol 80 indicates a variation in total energy of the aircraft 5, expressed by a variable representative of this total energy variation.

In the illustrated example, the variable representative of the total energy variation is homogeneous with a slope of the aircraft 5. The energy variation symbol 80 is laterally offset relative to the speed vector symbol 76, the relative position of the energy variation symbol 80 relative to the graduated slope scale 74 corresponding to the value of the variable representative of the total energy variation.

Preferably, the variable representative of the total energy variation is the pseudo-total slope $\gamma^*$ of the aircraft 5.

Thus, the relative position of the energy variation symbol 80 with respect to the speed vector symbol 76 indicates the acceleration sign of the aircraft 5: a horizontal alignment of the energy variation symbol 80 and the speed vector symbol 76 reflects a null acceleration; when the acceleration of the aircraft 5 is negative, i.e., the aircraft 5 is decelerating, the energy variation symbol 80 is positioned below the speed vector symbol 76, whereas when the acceleration of the aircraft 5 is positive, the energy variation symbol 80 is positioned above the speed vector symbol 76.

Furthermore, the distance between the energy variation symbol 80 and the speed vector symbol 76 is representative of the absolute value of the acceleration of the aircraft 5.

For example, as shown in FIG. 2, the energy variation symbol 80 is in a chevron shape, comprising a lower segment 80a and an upper segment 80b that are oblique and come together to form a tip 80c, the position of which along the vertical axis indicates, according to the graduated slope scale 74, the value of the pseudo-total slope $\gamma^*$ of the aircraft 5.

Furthermore, an energy variation bound symbol 84, representative of an energy variation threshold value associated with the upper acceleration bound Accmax or with the lower acceleration bound Accmin is displayed, preferably only when the deviation between the upper bound Accmax and the acceleration or the deviation between the acceleration and the lower acceleration bound Accmin is below a predetermined threshold deviation.

The energy variation bound symbol 84 thus indicates an upper or lower pseudo-total slope bound associated with the upper acceleration bound Accmax or the lower acceleration bound Accmin, respectively, in light of the current ground slope of the aircraft 5.

Thus, the upper energy variation bound symbol indicates a threshold pseudo-total slope value $\gamma^*_{max}$ associated with the acceleration Accmax equal to:

$$\gamma^*_{max} = \gamma_{sol} + \frac{Acc_{max}}{g}$$

Likewise, the lower energy variation bound symbol indicates a threshold value $\gamma^*_{min}$ of pseudo-total slope associated with the acceleration Accmin, equal to:

$$\gamma^*_{min} = \gamma_{sol} + \frac{Acc_{min}}{g}$$

The energy variation symbol 80 and the energy variation bound symbol 84 are laterally offset relative to the speed vector symbol 76, and aligned vertically.

The distance between the energy variation bound symbol 84 and the speed vector symbol 76 is representative of the absolute value of the upper Accmax or lower Accmin acceleration bound.

Furthermore, the distance between the energy variation symbol 80 and the energy variation bound symbol 84 is representative of a deviation between the current acceleration and the acceleration bound Accmin or Accmax, as long as the acceleration bound Accmin or Accmax is not reached.

Preferably, when the acceleration of the aircraft 5 is greater than the upper bound Accmax or lower than the lower bound Accmin, the energy variation bound symbol 84 remains superimposed on the energy variation symbol 80.

The energy variation bound symbol 84 has a shape complementary to that of the energy variation symbol 80. For example, as illustrated in FIG. 2, the upper or lower energy variation bound symbol 84 comprises an oblique segment 84a inclined by the same incline as the upper 80b or lower 80a segment, respectively, and the vertical segment 84b.

Alternatively, the symbol 84 can be in the shape of a chevron, similar to the symbol 80. The symbols 80 and 84 are then for example different colors.

As long as the acceleration of the aircraft 5 is below the upper acceleration bound Accmax, the vertical distance between the symbol 84 and the symbol 80 is representative of the deviation between the upper acceleration bound Accmax and the acceleration of the aircraft 5.

When the acceleration of the aircraft 5 becomes equal to the upper acceleration bound Accmax, the oblique segment 84a of the symbol 84 and the upper segment 80b of the symbol 80 are superimposed.

Likewise, as long as the acceleration of the aircraft 5 is above the lower acceleration bound Accmin, the vertical distance between the symbol 84 and the symbol 80 is representative of the deviation between the upper acceleration bound Accmin and the acceleration of the aircraft 5.

When the acceleration of the aircraft 5 becomes equal to, then lower than the lower acceleration bound Accmin, the oblique segment 84a of the symbol 84 and the lower segment 80a of the symbol 80 are superimposed.

A graduated speed scale 90 is also displayed, along which a speed symbol 92 is shown indicating the current speed of the aircraft 5.

As shown in FIG. 2, the speed symbol 92 is for example in the shape of a pentagon, one of the apices of which points to the graduated speed scale 90 and indicates the current value of the speed of the aircraft 5 on that scale. The speed symbol 92 also forms a frame in which the value of the current speed of the aircraft 5 appears, in numerical form.

Preferably, the graduations of the graduated speed scale 90 are movable relative to the speed symbol 92.

Furthermore, a second acceleration symbol 94, representative of the current acceleration of the aircraft 5, is positioned across from the graduated speed scale 90.

This symbol 94 is for example in the form of an arrow, which points downward or upward depending on whether the acceleration of the aircraft 5 is negative or positive, respectively, and the length of which is representative of the value of the acceleration of the aircraft 5, according to a predetermined scale.

Alternatively, the symbol 94 can assume the form of two parallel dashes with the same length, this length being representative of the value of the acceleration of the aircraft 5, along a predetermined scale.

Preferably, the symbol 94 is colored, the color of the symbol 94 depending on the acceleration of the aircraft 5.

For example, the symbol 94 is green as long as the acceleration of the aircraft 5 is comprised in the authorized acceleration range, and becomes amber when the acceleration of the aircraft 5 leaves the authorized acceleration range.

Furthermore, the symbol 94 becomes red when the acceleration of the aircraft 5 reaches an upper or lower acceleration bound. The upper acceleration bound is for example defined as a function of the deviation between the speed of the aircraft 5 and the maximum speed $V_{max}$, while the lower bound is for example defined as a function of deviation between the speed of the aircraft 5 and the minimum speed $V_{min}$. Thus, a red color of the symbol 94 indicates a flight zone in which, without corrective action on the acceleration, the speed of the aircraft 5 will leave the achievable speed domain.

Furthermore, stop symbols 95, positioned across from the symbol 94, indicate the upper $Acc_{max}$ and lower $Acc_{min}$ acceleration bounds, respectively. The position of the symbols 95 is representative of the value of the upper $Acc_{max}$ and lower $Acc_{min}$ acceleration bounds, on the same scale as that used for the symbol 94. Thus, if the acceleration symbol 94 exceeds a stop symbol 95, this reflects an excess of the upper $Acc_{max}$ or lower $Acc_{min}$ acceleration bound.

The graduated speed scale 90 is further provided with colored bands designed to indicate the critical speed ranges of the aircraft 5, and forming speed bound symbols indicating the speed bounds $V_{min}$, $V_{max}$, $V_{minOp}$, $V_{maxOp}$, $V_{MMSup}$ and $V_{MMInf}$.

These bands comprise two first bands 98 designed to respectively indicate the speed interval comprised between the maximum operational speed $V_{maxOp}$ and the maximum maneuverability speed $V_{MMSup}$ on the one hand, and the speed interval comprised between the minimum operational speed $V_{minOp}$ and the minimum maneuverability speed $V_{MMInf}$ on the other hand. In these speed intervals, the speed of the aircraft 5 remains comprised in the maneuverability range, but is outside the operational speed range. The bands 98 extend along the graduated speed scale between the maximum operational speed $V_{maxOp}$ and the maximum maneuverability speed $V_{MMSup}$ on the one hand, and between the minimum operational speed $V_{minOp}$ and the minimum maneuverability speed $V_{MMInf}$ on the other hand. The bands 98 are for example amber-colored. In FIG. 2, only the band 98 indicating the speed interval comprised between the minimum operational speed $V_{minOp}$ and the minimum maneuverability speed $V_{MMInf}$ is visible.

Two second bands 100 are also designed to respectively indicate the speed interval comprised between the maximum maneuverability speed $V_{MMSup}$ and the maximum achievable speed $V_{max}$ on the one hand, and between the minimum maneuverability speed $V_{MMInf}$ and the stall speed $V_{min}$ on the other hand. In these speed intervals, the speed of the aircraft 5 is no longer comprised in the minimum maneuverability range of the aircraft 5. The bands 100 extend along the graduated speed scale between the maximum maneuverability speed $V_{MMSup}$ and the maximum speed $V_{max}$ on the one hand, and between the minimum maneuverability speed $V_{MMInf}$ and the minimum speed $V_{min}$ on the other hand. The bands 100 are for example amber-colored. In FIG. 2, only the band 100 indicating the speed interval comprised between the minimum maneuverability speed $V_{MMInf}$ and the stall speed $V_{min}$ is visible.

Lastly, two bands 102 indicate speed intervals not achievable for the aircraft 5, i.e., speeds above the maximum speed $V_{max}$ or below the minimum speed $V_{min}$. These are speeds that may not in any case be reached by the aircraft 5. These bands are for example red. In FIG. 2, only the band 102 indicating speeds below the minimum speed $V_{min}$ is shown.

Figure 3:
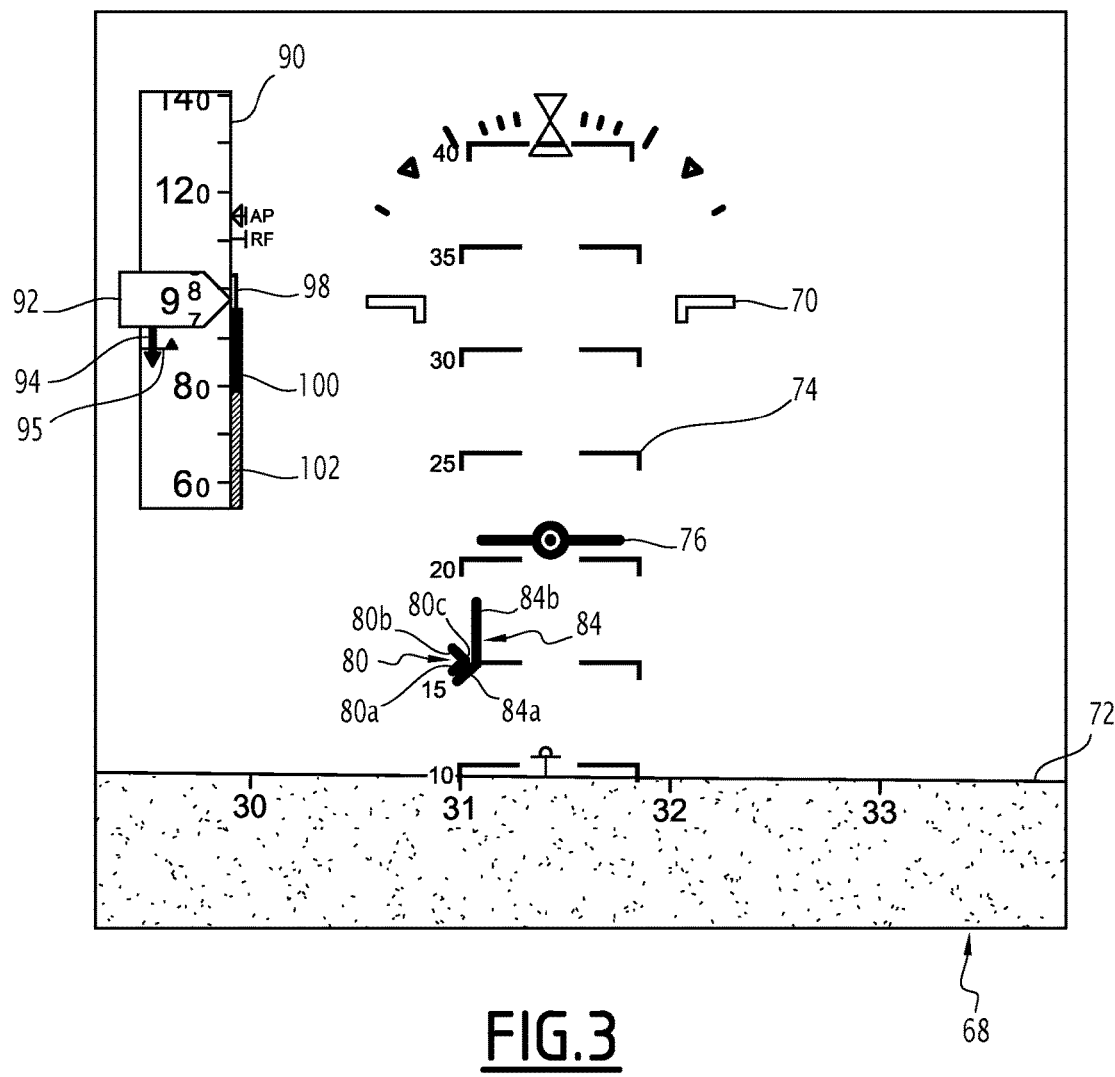
FIG. 3 shows an alternative illustration by the display device of information relative to the speed and acceleration of the aircraft.

FIG. 3 shows an alternative depiction of information by the information display device 34.

This alternative differs from it the depiction illustrated in FIG. 2 in that when the acceleration of the aircraft 5 becomes strictly lower (strictly higher, respectively) than the lower bound $Acc_{min}$ (higher than the upper bound $Acc_{max}$, respectively), the vertical segment 84b of the energy variation bound symbol 84 elongates upwardly (downwardly, respectively) relative to the oblique segment 84a, the elongation of the vertical segment 84b being proportional to the deviation between the value of the lower acceleration bound $Acc_{min}$ and the current acceleration of the aircraft.

According to another alternative that is not shown, the vertical distance between the symbol 84 and the symbol 80 is still representative of the deviation between the upper acceleration bound $Acc_{max}$ and the acceleration of the aircraft 5, respectively the deviation between the lower acceleration bound $Acc_{min}$ and the acceleration of the aircraft 5, even when the acceleration of the aircraft 5 becomes higher than the upper acceleration bound $Acc_{max}$, lower than the lower acceleration bound $Acc_{min}$, respectively.

Figure 4:
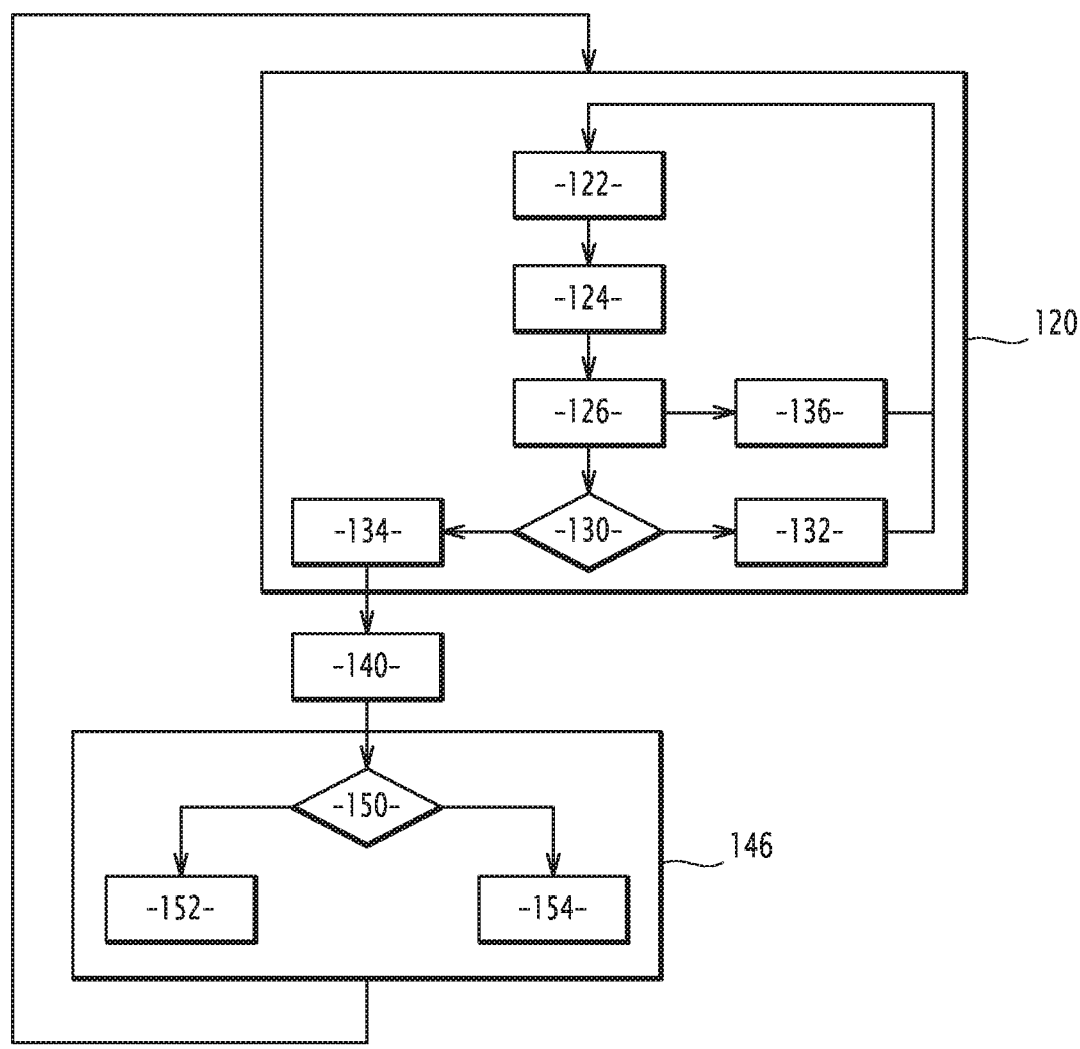
FIG. 4 is a block diagram illustrating the method according to one embodiment of the invention.

FIG. 4 shows a block diagram of one example embodiment of the method according to the invention, during a flight by the aircraft 5.

This method comprises a step 120 for monitoring the speed and acceleration of the aircraft 5.

This monitoring step 120 is preferably carried out at each moment during the flight of the aircraft 5.

The monitoring step 120 comprises a phase 122 for the determination, by the estimating module 48, of the first, second and third speed ranges.

In particular, during the phase 122, the estimating module 48 determines the minimal speed $V_{min}$, based on the aerodynamic configuration of the aircraft 5, the weight of the aircraft 5 and the load factor of the aircraft 5.

The estimating module 48 also determines the minimum maneuverability speed $V_{MMInf}$, based on the flight phase of the aircraft 5.

Furthermore, the estimating module 48 determines the minimum operational speed $V_{minOp}$, based on the flight phase of the aircraft 5 at that moment.

The monitoring step 120 further comprises a phase 124 for the determination, by the estimating module 48, of an energy variation of the aircraft 5, characterized by the pseudo-total slope γ*, from the ground slope and the acceleration of the aircraft 5.

The monitoring step 120 further comprises a phase 126 for the determination, by the monitoring module 50, of the authorized acceleration range for the aircraft 5 at that moment, based on the speed of the aircraft 5 at that moment, in particular based on the deviation between the speed of the aircraft 5 at that moment and the maneuverability range of the aircraft 5.

During the phase 126, the monitoring module 50 determines the upper acceleration bound $Acc_{max}$ as a function of the deviation between the maximum maneuverability speed $V_{MMSup}$, as determined during phase 122 by the estimating module 48, and the speed of the aircraft 5 at that moment. Furthermore, the monitoring module 50 determines the lower acceleration bound $Acc_{min}$ as a function of the deviation between the minimum maneuverability speed $V_{MMInf}$ as determined during the phase 122 by the estimating module 48 and the speed of the aircraft 5 at that moment.

The monitoring step 120 next comprises a comparison phase 130, during which the monitoring module 50 compares the acceleration of the aircraft 5 to the authorized acceleration range. In particular, the monitoring module 50 compares the acceleration of the aircraft 5 to the lower $Acc_{min}$ and upper $Acc_{max}$ acceleration bounds determined during the phase 126.

At the end of the phase 130, if the acceleration of the aircraft 5 is comprised in the authorized acceleration range, i.e., if the acceleration of the aircraft 5 is below the upper acceleration bound $Acc_{max}$ and above the lower acceleration bound $Acc_{min}$, the monitoring module 50 does not activate the acceleration control module 52 or deactivates it if it had been previously activated, at a deactivation moment, during a phase 132.

If, on the contrary, the acceleration of the aircraft 5 is not comprised in the authorized acceleration range, i.e., if the acceleration of the aircraft 5 is above the upper acceleration bound $Acc_{max}$ or below the lower acceleration bound $Acc_{min}$, the monitoring module 50 judges that without an action to redirect the acceleration of the aircraft 5, an excursion of the speed of the aircraft 5 outside the maneuverability range will be inevitable. The monitoring module 50 then activates the acceleration control module 52, at an activation moment, during a phase 134.

In parallel, during a phase 136 of step 120, the monitoring module 50 compares the speed of the aircraft 5 to the third speed range, in order to determine whether the speed of the aircraft 5 is comprised in the operational speed range of the aircraft 5. If the speed of the aircraft 5 is outside the third speed range, i.e., if the speed of the aircraft 5 is strictly greater than the maximum operational speed $V_{maxOp}$ or strictly less than the minimum operational speed $V_{minOp}$, the monitoring module 50 generates an alert for the pilot.

Preferably, this alert is only emitted if the absolute value of the deviation between the speed of the aircraft 5 and the maximum or minimum operational speed is above a given threshold, corresponding to an allowance margin, and if the speed of the aircraft 5 remains outside the third speed range for a duration exceeding a predetermined length of time.

The alert is for example emitted by the man-machine interface means 34. This alert is for example an audio and/or visual alert.

Thus, the monitoring module 50 generates an alert when the speed of the aircraft 5 leaves the operational speed range, therefore before the speed leaves the maneuverability range, independently of the activation of the acceleration control module 52. Such an alert thus gives the crew the opportunity to act on the manual controls of the aircraft 5 so that the speed of the aircraft 5 returns to the operational speed range, or at least remains in the maneuverability range.

Following the phase 134, i.e., following an activation of the acceleration control module 52 by the monitoring module 50, the acceleration control module 52 carries out a step 140 for generating an alarm signal intended for the crew, designed to warn the crew that an action will be taken by the acceleration control module 52 to modify the acceleration of the aircraft 5 if no action is taken by the crew.

If the acceleration control module 52 remains activated following the emission of this alarm signal, i.e., if no action has been taken by the crew or if, despite an action that has been taken, the acceleration of the aircraft 5 remains outside the authorized acceleration range, the acceleration control module 52 implements a step 146 for generating a control signal of at least one device controlling the acceleration of the aircraft 5 in order to bring the acceleration of the aircraft 5 toward the authorized acceleration range, so that the speed of the aircraft 5 stays within the maneuverability range, and in all cases in the achievable speed range.

The control signal generated by the acceleration control module 52 depends on the speed of the aircraft 5. In particular, as long as the speed of the aircraft 5 remains in the maneuverability range, the acceleration control module 52 acts on the devices modifying the drag and thrust of the aircraft 5, without acting on the trajectory of the aircraft 5. Conversely, if the speed of the aircraft 5 leaves the maneuverability range, the acceleration control module 52 modifies the trajectory of the aircraft 5 in order to bring the speed of the aircraft 5 toward the maneuverability range, while maintaining control over the drag and thrust modifying devices of the aircraft 5, in particular to modify the drag and/or the thrust in order to bring the acceleration of the aircraft 5 toward the authorized acceleration range, if such a modification is still possible, and to prevent any modification of the drag and thrust that would keep the acceleration of the aircraft 5 outside the authorized acceleration range.

The generating step 146 thus comprises a phase 150 for comparing the speed of the aircraft 5 to the maneuverability range of the aircraft 5, i.e., to the minimum $V_{MMInf}$ and maximum $V_{MMSup}$ maneuverability speeds, as determined by the estimating module 48 at that moment.

If the speed of the aircraft 5 is comprised in the maneuverability range, the acceleration control module 52 generates a control signal in a phase 152 for controlling at least one device for modifying the drag and/or thrust of the aircraft 5, in order to keep the speed of the aircraft in the maneuverability range.

Preferably, if the acceleration of the aircraft 5 is above the upper acceleration bound $Acc_{max}$, the acceleration control module 52 first generates, during the first phase 152, a control signal for the thrust of the aircraft 5, in particular a control signal for the propulsion system 7, in order to reduce the thrust of the aircraft 5. Then, if the acceleration control module remains active despite this action, i.e., if the acceleration of the aircraft 5 remains above the upper acceleration bound $Acc_{max}$, the acceleration control module 52 generates, during a second phase 152, a control signal of the drag modifying devices 9, in particular an output signal of the air brakes 11 and/or spoilers 13, in order to increase the drag of the aircraft 5.

Conversely, if the acceleration of the aircraft 5 is below the lower acceleration bound $Acc_{min}$, the acceleration control module 52 first generates, during a first step 152, a control signal for the drag modifying devices 9, in particular a signal to withdraw the air brakes 11 and/or spoilers 13, in order to decrease the drag of the aircraft 5. Then, if the acceleration control module 52 remains activated despite this action, i.e., if the acceleration of the aircraft 5 remains below the lower acceleration bound $Acc_{min}$, the acceleration control module 52 generates, during the second phase 152, a control signal for the thrust of the aircraft, in particular a control signal for the propulsion system 7, in order to increase the thrust of the aircraft 5.

If, conversely, the speed of the aircraft 5 is not comprised in the maneuverability range, the acceleration control module 52 generates, in a phase 154, a control signal of at least one device modifying the trajectory of the aircraft 5, in order to bring the speed of the aircraft 5 toward the maneuverability range.

During the phase 154, the acceleration control module 52 also controls the thrust and drag of the aircraft.

In particular, if the acceleration of the aircraft 5 is below the lower acceleration bound $Acc_{min}$ and the speed of the aircraft 5 is not comprised in the maneuverability range, the acceleration control module 52 prevents, during the phase 154, a deployment of the air brakes 11 and/or the spoilers 13, which would increase the drag of the aircraft 5, and prevents a decrease in the thrust of the aircraft 5.

If the acceleration of the aircraft 5 is above the upper acceleration bound $Acc_{max}$ and the speed of the aircraft 5 is not comprised in the maneuverability range, the acceleration control module 52 then prevents, during the phase 154, a withdrawal of the air brakes 11 and/or spoilers 13, which would decrease the drag of the aircraft 5, and prevents an increase in the thrust of the aircraft 5.

As described above, once the monitoring module 50 detects that the acceleration of the aircraft 5 is again comprised in the authorized acceleration range, the monitoring module 50 deactivates the acceleration control module 52 in a phase 132. In the deactivated state, the acceleration control module 52 is disconnected from any device controlling the acceleration of the aircraft 5 and therefore no longer exerts any action on these devices.

Thus, when the acceleration of the aircraft 5 leaves the authorized range in light of its speed, the acceleration control module 52 modifies the acceleration of the aircraft 5 until the acceleration of the aircraft 5 is once again comprised in the authorized range. The acceleration control module 52 is then deactivated, and only the manual piloting commands of the aircraft 5 affect the acceleration control devices of the aircraft 5.

In parallel, the information display device 34 displays, during the flight of the aircraft 5, information relative to the flight of the aircraft 5, in particular relative to the speed and acceleration of the aircraft 5, as illustrated in FIG. 2 or 3.

In particular, before each action performed by the acceleration control module 52, during the phases 152 and 154, the display device 34 displays a message for the pilot, in order to inform the pilot of the action about to be taken.

The system and method according to the invention thus make it possible to assist the crew during a manual flight, in order to prevent the speed of the aircraft 5 from reaching one of the bounds of the second speed range, in particular from reaching values that may compromise its maneuverability or even the integrity of its structure, but without entering an automatic mode in which the pilot no longer has control over certain commands, for example a mode in which the automatic throttle, controlling the thrust of the aircraft automatically, is activated.

In particular, the alarm signal generated once the acceleration of the aircraft 5 leaves the authorized range makes it possible to warn the crew that an action will be performed by the acceleration control module 52, and gives the crew an opportunity to manually modify the drag, thrust or trajectory of the aircraft 5 before an action is performed by the acceleration control module 52. Furthermore, this alarm signal, as well as the information displayed by the display device 34 relative to the actions performed by the acceleration control module 52, makes it possible to inform the crew when a modification of the acceleration will be or is being done by the acceleration control module 52, and therefore makes it possible to make the pilot aware that a protection function is being implemented and altering manual piloting.

Furthermore, the implementation of protection by the acceleration control module 52 even before the speed leaves the maneuverability range makes it possible to have a certain maneuvering margin, and to modify first the thrust and drag of the aircraft 5, in order to redirect the acceleration of the aircraft 5, while retaining the possibility of modifying the trajectory of the aircraft 5 subsequently, if the modification of the thrust and drag proves insufficient. Indeed, when the speed of the aircraft 5 reaches the maximum or minimum maneuverability speed, the trajectory of the aircraft 5 can still be modified.

It must be understood that the embodiments described above are not limiting.

In particular, in one particular embodiment, the system and method according to the invention are implemented only at high or low speeds. This embodiment corresponds to the case where one of the bounds of the authorized acceleration range is infinite.

Furthermore, the system and method according to the invention can be implemented independently of the display device.

Furthermore, the second speed range can be a desired speed range for the aircraft other than a maneuverability range of the aircraft. For example, the second speed range can be defined based on the flight plan, in particular as a speed range guaranteeing passage of the aircraft by certain points in predefined time intervals.

What is claimed is:

1. An aircraft piloting assistance system during manual piloting of an aircraft, the system comprising:
   a monitor configured to compare, at each moment, an acceleration relative to the air of the aircraft at the moment to an authorized acceleration range for the aircraft at the moment, the authorized acceleration range depending on an airspeed of the aircraft at the moment, and
   an acceleration controller switchable between an activated state and a deactivated state, the acceleration controller being configured, in the activated state, excluding the deactivated state, to generate a control signal of at least one control device of the acceleration relative to the air of the aircraft at least at one control moment in order to bring the acceleration relative to the air of the aircraft toward the authorized acceleration range, in order to keep or bring the airspeed of the aircraft in or toward a predefined usage airspeed range, the usage airspeed range being defined between an upper bound corresponding to a maximum usage airspeed of the aircraft, and a lower bound corresponding to a minimum usage airspeed of the aircraft, the maximum usage airspeed of the aircraft being independent of an aerodynamic configuration of the aircraft and of a flight phase of the aircraft,
   the monitor being configured to activate the acceleration controller at a given activation moment when the acceleration relative to the air of the aircraft at the given activation moment is not comprised in the authorized acceleration range.

2. The assistance system as recited in claim 1 wherein the monitor is configured to deactivate the acceleration controller at a given deactivation moment, after the given activation moment, if the acceleration relative to the air of the aircraft at the given deactivation moment is comprised in the authorized acceleration range.

3. The assistance system as recited in claim 1 wherein the acceleration controller is comprised in the group consisting of a device configured to modify a drag of the aircraft, a device configured to modify a thrust of the aircraft, and a device configured to modify a trajectory of the aircraft.

4. The assistance system as recited in claim 1 wherein the authorized acceleration range is defined by at least one upper acceleration bound authorized at the moment, the upper bound depending on a deviation between the maximum usage airspeed of the aircraft and the airspeed of the aircraft at the moment.

5. The assistance system as recited in claim 4, wherein the upper acceleration bound is a strictly increasing function of the deviation between the maximum usage airspeed of the aircraft and the airspeed of the aircraft at the moment.

6. The assistance system as recited in claim 1 wherein the authorized acceleration range is defined by at least one lower acceleration bound authorized at the moment, the lower bound depending on a deviation between the airspeed of the aircraft at the moment and the minimum usage airspeed of the aircraft.

7. The assistance system as recited in claim 6 wherein the usage airspeed range is defined between the upper bound corresponding to a maximum maneuverability airspeed of the aircraft, and the lower bound corresponding to a minimum maneuverability airspeed of the aircraft.

8. The assistance system as recited in claim 6, wherein the lower acceleration bound is a strictly decreasing function of the deviation between the airspeed of the aircraft at the moment and the minimum usage airspeed of the aircraft.

9. The assistance system as recited in claim 1 wherein the acceleration controller is configured to:
   compare the airspeed of the aircraft at the control moment to the usage airspeed range,
   generate a control signal of a first type if the airspeed of the aircraft at the control moment is comprised in the usage airspeed range, in order to keep the airspeed of the aircraft in the usage airspeed range, and
   generate a control signal of a second type, different from the first type, if the airspeed of the aircraft at the control moment is not comprised in the usage airspeed range, in order to bring the airspeed of the aircraft toward the usage airspeed range.

10. The assistance system as recited in claim 9 wherein the control signal of the first type is a control signal of at least one device configured to modify a drag or a thrust of the aircraft, and the control signal of the second type is a control signal of at least one device configured to modify a trajectory of the aircraft.

11. The assistance system as recited in claim 1 further comprising a display configured to display information relative to a flight of the aircraft, the information comprising information relative to an energy variation of the aircraft, the display being configured to display, on a viewing screen, an energy variation symbol representative of a current value of a total energy variation of the aircraft, and at least one energy variation bound symbol representative of a threshold value of the total energy variation, corresponding to a bound of the authorized acceleration range.

12. The assistance system as recited in claim 1, wherein the maximum usage airspeed of the aircraft is a maximum maneuverability airspeed determined as:

$$V_{MMSup} = VD - X',$$

where $V_{MMSup}$ is the maximum maneuverability airspeed of the aircraft, VD denotes a maximum speed that the aircraft can assume without risk to its structure, and X' is comprised between 10 and 30 m/s.

13. The assistance system as recited in claim 1, wherein the minimum usage airspeed of the aircraft is proportional to a stall speed of the aircraft under a load factor of 1 g.

14. The assistance system as recited in claim 13, wherein the minimum usage airspeed of the aircraft is a minimum maneuverability airspeed determined as:

$$V_{MMInf} = k * VS1 \text{ g},$$

where $V_{MMInf}$ is the minimum maneuverability airspeed of the aircraft, k is a proportionality factor comprised between 1 and 1.2, and VS1 g is the stall speed of the aircraft under the load factor of 1 g.

15. The assistance system as recited in claim 14, wherein the proportionality factor k depends on a current flight phase of the aircraft, the proportionality factor k having a first value during takeoff, and a second value, greater than the first value, during other flight phases of the aircraft.

16. The assistance system as recited in claim 1, wherein the minimum usage airspeed of the aircraft is strictly higher than a stall speed of the aircraft.

17. The assistance system as recited in claim 1, wherein the airspeed is an indicated airspeed of the aircraft, the acceleration relative to the air of the aircraft is a variation of the indicated airspeed of the aircraft and the authorized acceleration range for the aircraft is an authorized range for the variation of the indicated airspeed of the aircraft.

18. The assistance system as recited in claim 1, wherein an acceleration outside the authorized acceleration range corresponds to a situation in which, if no corrective action is taken to redirect the acceleration by the at least one control device, in light of reaction times of the at least one control device, an excursion of the airspeed of the aircraft outside a maneuverability range of the aircraft is unavoidable.

19. The assistance system as recited in claim 1, wherein the acceleration controller is configured only to provide periodic assistance in order to prevent the airspeed of the aircraft from leaving a maneuverability range of the aircraft, and to prevent the airspeed of the aircraft from leaving a speed range achievable by the aircraft.

20. The assistance system as recited in claim 1, wherein the monitor is configured such that the comparison of the acceleration to the authorized acceleration range detects situations in which, without action by the pilot, the airspeed of the aircraft would leave or remain outside a maneuverability range of the aircraft, the acceleration controller being kept activated as long as a risk of leaving or remaining outside of the maneuverability range exceeds a determined threshold.

21. An aircraft piloting assistance method for an aircraft during manual piloting of the aircraft, the method comprising:
   an activation step, during which a monitor detects that an acceleration relative to the air of the aircraft at a given activation moment is not comprised in an authorized acceleration range, the authorized acceleration range depending on an airspeed of the aircraft at the given activation moment, and activates an acceleration controller; and
   upon activation of the acceleration controller, a generating step, comprising generating, by the activated acceleration controller, a control signal of at least one device configured to control the acceleration relative to the air of the aircraft at least at one control moment in order to bring the acceleration relative to the air of the aircraft toward the authorized acceleration range, in order to maintain or bring the airspeed of the aircraft in or toward a predefined usage airspeed range, the usage airspeed range being defined between an upper bound corresponding to a maximum usage airspeed of the aircraft, and a lower bound corresponding to a minimum usage airspeed of the aircraft, the maximum usage airspeed of the aircraft being independent of an aerodynamic configuration of the aircraft and of a flight phase of the aircraft.

22. The assistance method as recited in claim 21 wherein the generating step comprises:
   comparing an airspeed of the aircraft at the control moment to the predefined usage airspeed range, and
   generating a control signal of at least one acceleration control device of the aircraft of a first type, if the airspeed of the aircraft at the control moment is comprised in the usage airspeed d range, in order to keep the airspeed of the aircraft in the usage airspeed range, or generating a control signal of at least one device controlling the acceleration relative to the air of the aircraft of a second type, different from the first type, if the airspeed of the aircraft at the control moment is not comprised in the usage airspeed range, in order to bring the airspeed of the aircraft toward the usage airspeed range.

23. The assistance method as recited in claim 22 wherein the control signal of the first type is a control signal of at least one device configured to modify a drag or a thrust of the aircraft, the control signal of the second type being a control signal of at least one device configured to modify a trajectory of the aircraft.

24. The assistance method as recited in claim 23 further comprising a deactivation step, after the generating step, during which the monitor detects that the acceleration relative to the air of the aircraft is comprised in the authorized acceleration range, at a given deactivation moment after the given activation moment, and deactivates the acceleration controller.

25. An aircraft piloting assistance system during manual piloting of an aircraft, the system comprising:
   a monitor configured to compare, at each moment, a longitudinal acceleration relative to the air of the aircraft at the moment to an authorized longitudinal acceleration range for the aircraft at the moment, the authorized longitudinal acceleration range depending on a longitudinal airspeed of the aircraft at the moment, and
   an acceleration controller switchable between an activated state and a deactivated state, the acceleration controller being configured, in the activated state, excluding the deactivated state, to generate a control signal of at least one control device of the longitudinal acceleration relative to the air of the aircraft at least at one control moment in order to bring the longitudinal acceleration relative to the air of the aircraft toward the authorized longitudinal acceleration range, in order to keep or bring the longitudinal airspeed of the aircraft in or toward a predefined usage longitudinal airspeed range, the monitor being configured to activate the acceleration controller at a given activation moment when the longitudinal acceleration relative to the air of the aircraft at the given activation moment is not comprised in the authorized longitudinal acceleration range, wherein the longitudinal airspeed of the aircraft at the moment is an indicated airspeed of the aircraft at the moment, the longitudinal acceleration relative to the air of the aircraft at the moment is a variation of the indicated airspeed of the aircraft at the moment, the authorized longitudinal acceleration range for the aircraft is an authorized range for the variation of the indicated airspeed of the aircraft and the predefined usage longitudinal airspeed range is a predefined usage indicated airspeed range.

26. An aircraft piloting assistance system during manual piloting of an aircraft, the system comprising:
   a monitor configured to compare, at each moment, an acceleration relative to the air of the aircraft at the moment to an authorized acceleration range for the aircraft at the moment, the authorized acceleration range depending on an airspeed of the aircraft at the moment, and
   an acceleration controller switchable between an activated state and a deactivated state, the acceleration controller being configured, in the activated state, excluding the deactivated state, to generate a control signal of at least one control device of the acceleration relative to the air of the aircraft at least at one control moment in order to bring the acceleration relative to the air of the aircraft toward the authorized acceleration range, in order to keep or bring the airspeed of the aircraft in or toward a predefined usage airspeed range, the usage airspeed range being defined between an upper bound corresponding to a maximum usage airspeed of the aircraft, and a lower bound corresponding to a minimum usage airspeed of the aircraft, the minimum usage airspeed of the aircraft being proportional to a stall speed of the aircraft under a load factor of 1 g, the monitor being configured to activate the acceleration controller at a given activation moment when the acceleration relative to the air of the aircraft at the given activation moment is not comprised in the authorized acceleration range.

* * * * *